Feb. 5, 1929. 1,701,094

R. A. BECKER

LONG SPLICE CLAMP

Filed April 19, 1927

Inventor
Robert A. Becker
By his Attorney
John J. Thompson

Patented Feb. 5, 1929.

1,701,094

UNITED STATES PATENT OFFICE.

ROBERT A. BECKER, OF POUGHKEEPSIE, NEW YORK.

LONG-SPLICE CLAMP.

Application filed April 19, 1927. Serial No 184,946.

This invention relates to a long splice for the purpose of securing together wires that have been spliced or interwoven and the invention relates more particularly to forming a wire connection in railroad signaling circuits, although it may also be employed where it is desired to clamp a splice comprising one wire and a cable having a number of strands.

The object of the invention is to provide in combination with a mechanical clamp of a novel method of splicing a single wire to a stranded wire or cable in such a manner as not to increase the original diameter of the stranded cable, and yet provide a strong joint, giving a perfect electrical contact.

Another object of the invention is to provide a splice that shall be simple, durable and efficient.

With these and other objects in view, my invention consists in certain construction and combination of parts as will hereinafter be fully described and illustrated in the accompanying drawings which form a part hereof, and in which like figures of reference refer to corresponding parts in all of the views, and it is understood that slight changes may be made without departing from the spirit of the invention.

In forming splices of electrical wires where it is desired to join a single strand of insulated wire to a twisted cable containing a number of strands of wire, it has been found difficult to form such a joint in a neat manner and without increasing the diameter of the stranded cable by winding the single wire upon the surface of the same.

First taking the end of the stranded cable, one of the strands is unwound from the other twisted strands for a suitable distance and cut from the cable, thus leaving a spiral groove in the cable.

The end of the insulated wire is now taken, and the insulation stripped off of the wire for a length about equal to the length of the groove in the cable then bringing the ends of the wires together, the single wire is placed in the groove to make about one complete wrap or turn in the cable, and then over the splice thus formed is secured a clamp which applies pressure upon the splice forcing all of the wires together to form a solid, strong perfect electrical and mechanical joint, without in any way increasing the diameter of the cable.

Also by this method if at any time it is desired to disconnect the wires, this can be done by the removal of the clamp, and pulling apart of the wires by a slight turning movement which will unscrew one from the other.

Figure 1:
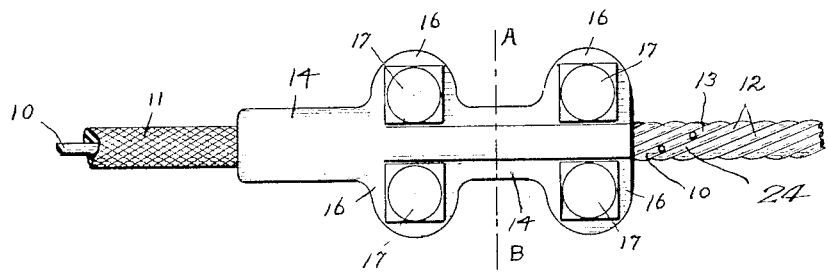
Figure 1 shows a top plan view of the clamp securing together an insulated wire and a stranded cable.
Figure 2:
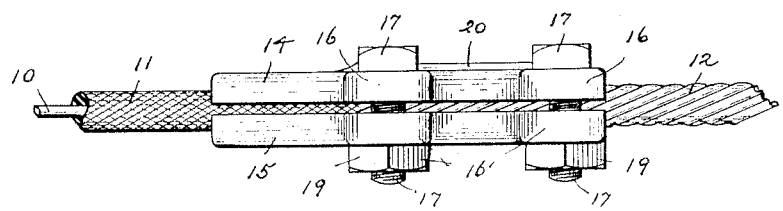
Figure 2 is a side view of the same.

Referring to the drawings, the insulated wire is indicated by the numeral 10, and the insulation by the numeral 11, while the twisted cable is shown by 12 and the strand which is partly removed by 13.

The clamp comprises a top part 14 and a bottom part 15, both of which are formed with ears 16 for the reception of the securing bolts 17, which may be passed through clearance holes 18 in both the top and the bottom, or through clearance holes in one part and threaded holes in the other part, and provided with the nuts 19.

The upper side of the top part 14 is provided with a rib 20 against which the side of the heads of the bolts contact to prevent the bolts from turning in the holes as the nuts 19 are tightened up.

Both of said parts 14 and 15 are formed with the grooves 21 and 22, which are aligned, and which when the parts 14 and 15 are put together form a bore to receive the wires; the groove 21 being of the proper diameter to clamp the stranded cable 12, while the groove 22 which forms a part of it, is of a larger diameter, so that the insulated wire 11 is a loose fit therein and can not be clamped in a tight manner; this being for the purpose of allowing a certain swing to the insulated wire within the clamp to prevent its breaking, and the outer end of said groove 22 being rounded as at 23.

Figure 3:
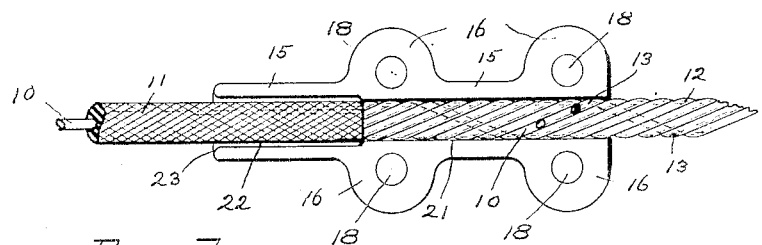
Figure 3 is a view similar to Figure 1, but with the top half of the clamp removed to show the joining of the wires.
Figures 4, 5, 6:
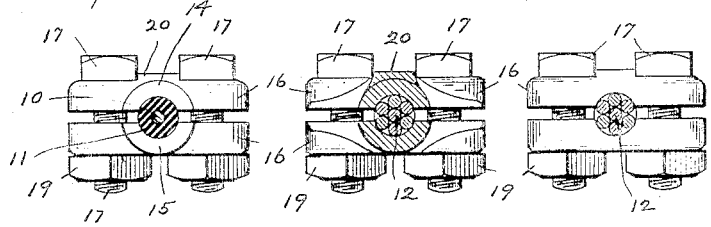
Figure 4 is an end view showing a section of the insulated wire.
Figure 5 is a cross sectional view taken on the line A—B of Figure 1.
Figure 6 is an end view, showing a section of the stranded cable.

By referring to Figure 3 of the drawing, it will be seen that the strand 13 has been removed from the cable for a short distance from the end, and that the insulation 11 has been removed from the wire 10 for a similar distance, and that the bare wire 10 has been laid in the groove 24, thus forming a part of the cable and making the splice.

It is to be understood that the shape of the clamp may be varied to suit conditions, and that it may be made of any suitable material, also that two bolts may be used in place of four if desired.

Having thus described my invention, what I claim as new and desire to secure by Letters Patent is:

1. The method of splicing a single wire to a number of twisted wires, which comprises untwisting one of said twisted wires for a short distance from the end and detaching the same, to leave a spiral groove, placing the single wire in said groove, and clamping all of said wires together.

2. The method of joining a single insulated wire to a series of twisted wires, which comprises removing a portion of one of said twisted wires, baring the insulated wire, and placing said bared portion in place of the removed portion of said twisted wire, and securing all of said wires together by clamping means.

In testimony whereof I hereunto affix my signature.

ROBERT A. BECKER.